United States Patent Office 3,185,704
Patented May 25, 1965

3,185,704
FORMAMIDE OF MONO-ALKENYL SUCCINIMIDE
Donald J. Kahn, Elizabeth, and Roger E. Chandler, Westfield, N.J., assignors to Esso Research and Engineering Company, a corporation of Delaware
No Drawing. Filed Sept. 4, 1962, Ser. No. 221,364
4 Claims. (Cl. 260—326.3)

This invention relates to formamides which are condensation products of formic acid and succinimide, to methods of preparing said formamides and to hydrocarbon and oil compositions containing said formamides. Particularly, the invention relates to a formamide of a succinimide which can be prepared by condensing an alkenyl succinic anhydride and a polyamine to form said succinimide, followed by the conversion of at least one amine group of said succinimide to a formamide group, and to compositions such as lubricating oil, gasoline, heating oil, etc. containing the resulting formamide as a sludge dispersing agent.

Recently, various nitrogen-containing derivatives of high molecular weight alkenyl succinic anhydrides have become known as sludge dispersants for lubricating oils. Several of such derivatives are described in U.S. Patents 3,018,247; 3,018,250 and 3,018,291. A particularly effective derivative of this general type is prepared by reacting both acidic groups of an alkenyl succinic anhydride with a polyamine, specifically tetraethylene pentamine, to form an imide, as described in Australian patent application No. 63,803, filed August 22, 1960. It has now been found that derivatives of the last named type can be even further improved in their sludge dispersing and other properties by converting at least one of the amine groups to a formamide group.

The alkenyl succinic anhydrides are readily prepared by reacting maleic anhydride with an organic compound having a double bond at its end to thereby give compounds of the general formula:

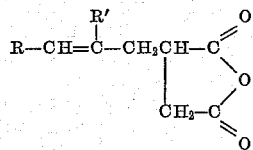

wherein R and R' can be hydrogen or hydrocarbon radicals, either substituted (e.g., chlorinated or sulfurized) or unsubstituted, including aliphatic, alicyclic, aromatic radicals, etc., although at least one of said R and R' must be a hydrocarbon radical. The total number of carbon atoms in R and R' will generally be 40 to 250, preferably 70 to 120. Because of its ready availability and low cost, the alkenyl portion of the molecule is preferably obtained by reacting a polymer of a $C_2$ to $C_5$ monoolefin with the maleic anhydride, said polymer generally having a molecular weight of about 700 to 3,000, e.g., about 800 to 1300. A particularly preferred example of such an olefin polymer is polyisobutylene. In this case, R will be hydrogen, while R' will be the radical.

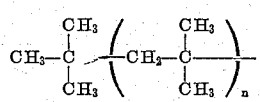

where $n$ is determined by the molecular weight of the polyisobutylene being used.

The preparation of alkenyl succinic anhydride is known in the art, for example, see U.S. 3,018,250, column 3, lines 57 to 71, Example 1. In general about equal molar proportions of maleic anhydride and the olefinic material are simply heated together. Inert solvents, such as toluene, xylene, etc., can be used to lower the viscosity of the reaction product to permit easier filtration. The solvent can then be subsequently removed by evaporation at the completion of the reaction. Or, if the solvent is a mineral oil, then the oil can be left in the composition. The reaction is illustrated as follows:

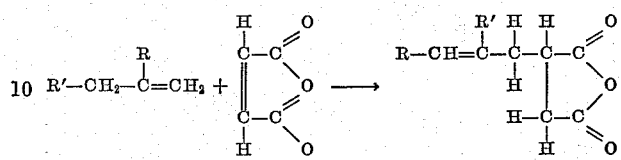

wherein R and R' have the meanings previously given.

The polyamine is condensed with the alkenylsuccinic anhydride by heating the two materials together while removing the water of condensation. No catalyst is required, although a water-entraining agent such as heptane or toluene can be used.

Polyamine reactants for the formation of alkenyl succinimides include those of the general formula:

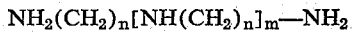

$$NH_2(CH_2)_n[NH(CH_2)_n]_m\text{---}NH_2$$

where $n$ is 1 to 5, preferably 2 or 3, and $m$ is 0 to 10, preferably 0 to 4. Specific examples of such polyamines include ethylene diamine, diethylene triamine, dimethylene triamine, tetraethylene pentamine, octaethylene nonamine, propylene diamine, tetrapropylene pentamine, etc.

The reaction of the imide condensation product of the alkenylsuccinic anhydride and the polyamine with formic acid is carried out with the removal of one molecule of water for every molecule of formic acid reacted. This reaction can be carried out by refluxing the imide and formic acid together, preferably with a solvent such as xylene or toluene present as a water-entraining agent, to form at least a monoformamide. By reaction of said imide condensation product with a larger proportion of formic acid, multiformamides can be formed, depending upon the number of amine groups available in the aforementioned imide condensation product.

The preceding reactions may be illustrated as follows, using one mole of formic acid per mole of imide.

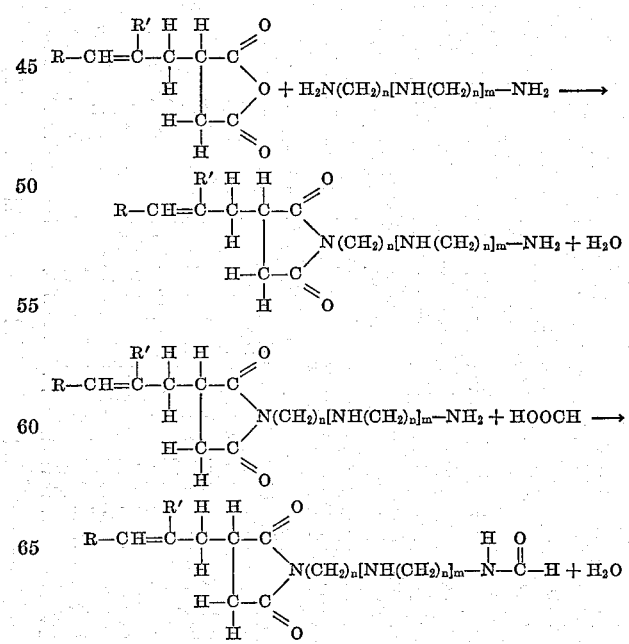

R, R', $m$ and $n$ have the same meanings as previously given.

If two moles of formic acid is used, then the reaction probably proceeds to give a product represented by the formula:

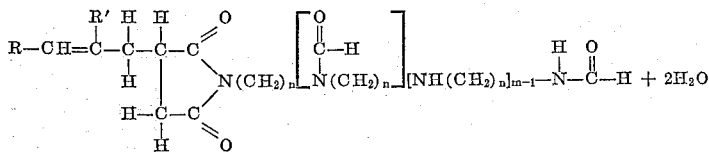

where not only is the terminal amine group converted to a formamide, but one of the other amine groups in the polyamine chain is also converted to formamide group.

The above reactions of the formic acid with the imide, i.e. the alkenyl succinic-polyamine condensation product, are not known with certainty, but are believed to represent the reaction of the invention. Thus, infra-red analysis indicates that the terminal amine group is the most reactive to the formic acid and is the first group to be converted to a formamide. Infra-red analysis of experimental products further indicates that after the terminal primary amine group has been converted to a formamide, then secondary amine groups are next to be converted to formamides. However, in a polyamine chain with a number of secondary amine groups present, it is not known in which order, if any, these secondary amine groups react with formic acid. Probably, a range of compounds are formed in which secondary amine groups in different positions within the chain are converted to formamide groups.

Lubricating oil compositions for crankcase use will comprise a major proportion of lubricating oil, and 0.001 to 10.0 wt. percent, preferably .25 to 5.0 wt. percent of the formamide of the invention. For ease of handling, concentrates of 10 to 80 wt. percent formamide in mineral oil can be prepared.

The oil component of the lubricating oil compositions can be a mineral lubricating oil or a synthetic lubricating oil such as diesters, e.g. di-2-ethylhexyl sebacate, complex esters, carbonate esters, polysilicones and other synthetic oils.

The composition of the invention can also include conventional additives in amounts of 0.05 to 10.0 wt. percent each, based on the total weight of the composition. For example, oxidation inhibitors such as phenyl-alpha-naphthylamine; rust inhibitors such as sodium nitrite and lanolin; antiwear agents such as tricresyl phosphate and zinc dialkyl dithiophosphates; other dispersants or detergent additives such as calcium petroleum sulfonate and barium phenate sulfide; V.I. improvers; pour depressants; dyes; etc. can be used.

The invention will be further understood by the following examples which include a preferred embodiment of the invention.

EXAMPLE I

*Part A.*—Alkenyl succinic anhydride was prepared as follows:

2700 grams of polyisobutylene of 1800 molecular weight (Staudinger), and 147 grams of maleic anhydride were heated together at a temperature of about 450° F. for about 22 hours. After 22 hours heating, the heated mixture was then diluted with 787 grams of a white oil. The composition was then filtered through a Hyflo filter aid. The white oil was used simply to reduce the viscosity of the alkenyl succinic anhydride to permit easier filtering. The recovered product consisted of 77.4 wt. percent alkenyl succinic anhydride dissolved in 22.6 wt. percent oil, and was a semi-solid gummy material of dark amber color, having a saponification number of 32.7 mg. KOH/gm. of product.

*Part B.*—3634 grams of the recovered product of Part A above (77.4 wt. percent alkenyl succinic anhydride), 173 grams of tetraethylenepentamine and 50 grams of toluene were heated to reflux in a flask equipped with a stirrer, thermometer and a Dean-Stark trap, at 120° C. for 6 hours while removing water of condensation until 16.5 ml. of water had collected in the Dean-Stark trap.

The contents of the flask was then stripped of the toluene by heating at 100° C. while bubbling nitrogen through said contents which took about 18 hours. The residue was then cooled to give a product which contained 1.41 wt. percent nitrogen and which was an oil solution of polyisobutenyl succinimide.

*Part C.*—650 grams (0.13 mole) of the succinimide-oil product of Part B and 5.6 ml. of concentrated formic acid (88 wt. percent formic acid in 12 wt. percent water) (0.13 mole) were mixed with 1950 ml. of xylene. The entire mixture was heated to reflux for 5 hours, during which time 3 ml. of water was collected in a Dean-Stark trap. The residue was then cooled and no formic acid odor was noted, thus indicating that all formic acid had reacted. The residue was then stripped on a steam bath by blowing nitrogen through the hot residue and thereby removing xylene. The resulting formamide material had a nitrogen content of 1.39 wt. percent, against a calculated theoretical nitrogen content for the monoformamide of 1.40 wt. percent.

EXAMPLE II 650 grams (0.13 mole) of the oil solution of polyisobutenyl succinimide of Example I, Part B, was added to a flask along with 1950 grams of xylene as a water-entraining agent and 65 ml. of aqueous formic acid (88 wt. percent formic acid and 12 wt. percent water) equivalent to 1.52 moles of formic acid. This mixture was then heated to reflux at atmospheric pressure for 6 hours during which time a total of 55 ml. of water and excess formic acid accumulated in a Dean-Stark trap. At the end of this time, the residue was heated on a steam bath while blowing nitrogen through said residue in order to remove the xylene water-entraining agent and other volatiles. 661 grams of product was recovered having a nitrogen content of 1.35 wt. percent, as against a calculated nitrogen content for the triformamide of 1.39 wt. percent. The product also had a direct oxygen content of 1.93 wt. percent as opposed to a calculated oxygen content of 2.06 wt. percent. The direct oxygen content indicated an average of 3 formamide groups per molecule had been formed.

The products of Example I, Part C, and Example II above, were each tested for sludge dispersing ability in the ER4–90 Ford Sludging Test. Prior experience had shown that this sludging test gave sludge deposits similar to those obtained in operation of New York City taxi-cabs.

Briefly described, in this test, a Ford 6-cylinder engine is run on a dynamometer stand through three cycles operating at different speeds and temperatures. After completion of the third cycle, the three cycles are repeated over and over again in sequence, until the desired total test time has lapsed. Make-up oil is added as required so that the oil level at all times is maintained between 3½ and 4 quarts. The engine is inspected at the end of 66, 110, 154, 198, 242 and 286 hours of operation. This inspection is carried out by disassembling the engine sufficiently to examine the following eight parts for sludge:

Rocker arm cover
Rocker arm assembly
Cylinder head
Push rod chamber
Push rod chamber cover
Crankshaft
Oil pan
Oil screen Each of the first seven parts is visually rated on a numerical scale wherein 10 is perfectly clean and 0 is completely fouled, with numbers between 0 and 10 denoting varying amounts of deposits. The oil screen is rated as "percent covered with sludge."

COMPOSITION 1

A fully formulated crankcase premium motor oil composition containing the product of Example I, Part C, was prepared by simple mixing of the following ingredients:

1.33 wt. percent of the oil solution of formamide of Part C of Example I.
3.5 wt. percent of detergent-inhibitor
0.9 wt. percent of an oil solution consisting of 74 wt. percent of a zinc dialkyl dithiophosphate and 26 wt. percent oil.
94.27 wt. percent of a mineral lubricating oil having a viscosity of 325 SUS at 100° F. and a V.I. of 100.

The alkyl groups of the zinc dialkyl dithiophosphate consisted of 65 wt. percent isobutyl groups and 35 wt. percent of primary amyl group.

COMPOSITIONS 2 AND 3

Two other compositions were prepared similar to Composition 1, except that in Composition 2, 1.33 wt. percent of the formamide product (1.0 wt. percent active ingredient) of Example II was used, while in Composition 3, 1.33 wt. percent of additional 325 SUS mineral lubricating oil was used in place of the 1.33 wt. percent oil solution of formamide.

COMPOSITION 4

A comparison composition was prepared exactly as Composition 1, except that in place of the 1.33 wt. percent of the oil solution of Part C, there was used 1.33 wt. percent of a concentrate consisting of 25 wt. percent mineral lubricating oil and 75 wt. percent of a material having the formula:

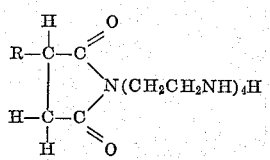

where R was a polyisobutenyl group of about 900 mol. wt.

The results of the ER4-90 test on Compositions 1 to 4 are summarized in Table III which follows:

Table III

ER4-90 TEST RESULTS

[Merit rating/percent oil screen covered with sludge]

| Hours | Composition | | | |
|---|---|---|---|---|
| | 1 | 2 | 3 | 4 |
| 55 | 9.99/0 | 9.99/0 | | |
| 66 | | | 9.98/0 | 9.99/0 |
| 104.5 | 9.99/0 | 9.99/0 | | |
| 110 | | | 9.9/0 | 9.90/0 |
| 148 | 9.9/0 | | | |
| 148.0 | | 9.95/0 | | |
| 154 | | | 9.2/0 | 9.75/0 |
| 192.5 | 9.7/0 | 9.85/0 | | |
| 198 | | | 7.4/0 | |
| 236.5 | 9.5/0 | 9.55/0 | | |
| 241 | | | | |
| 242 | 9.3/0 | | 6.9/5 | 8.8/0 |
| 286 | | 9.4/0 | 6.7/10 | 8.8/0 |

The merit results of Table III were an average of the seven areas of inspection previously described. In all cases with Compositions 1 and 2, no sludge was found on the oil screens, thus indicating that the sludge dispersants of both Compositions 1 and 2 has so finely dispersed the sludge that formed during the engine operation that the sludge could not be filtered by the normal oil filter. On the other hand, the merit rating of the oil base without the formamide, i.e. Composition 3, had fallen considerably after 198 hours. Also, Composition 3 resulted in 5% of the oil screen being covered with sludge after 242 hours of test, with 10% of said screen covered after 286 hours of test. The superiority of Composition 1 and Composition 2 of the invention over the related prior art material of Composition 4 in sludge dispersancy is shown at the 242 and 286 hour level.

In addition to its use in lubricating oil, the formamide of the invention can be used in normally liquid petroleum hydrocarbons such as gasoline and fuel oils. Usually, the amount of formamide for these purposes will be about .001 to 1.0 wt. percent. For example, .005 wt. percent of the product of Part C of Example I can be added to gasoline.

Also, while the preceding examples have utilized the formamide in the form of an oil solution, the formamide per se can be prepared. For example, this can be done by repeating Example I, Parts A, B, and C, but omitting the white oil.

What is claimed is:

1. A formamide of 1 to 2 molar proportions of formic acid and 1 molar proportion of mono-alkenyl succinimide wherein said alkenyl group is unsubstituted and contains 40 to 250 carbon atoms and said succinimide is the succinimide of mono-alkenyl succinic anhydride and a polyamine of the formula:

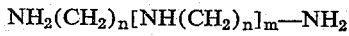

where $n$ is 2 to 3 and $m$ is 0 to 4.

2. An oil-soluble formamide of 1 to 2 molar proportions of formic acid and 1 molar proportion of mono-alkenyl succinimide wherein said alkenyl group is a polyisobutylene radical and said succinimide is the succinimide of mono-alkenyl succinic anhydride and tetraethylene pentamine.

3. A method which comprises condensing 1 molar proportion of a monoalkenyl succinimide having the formula:

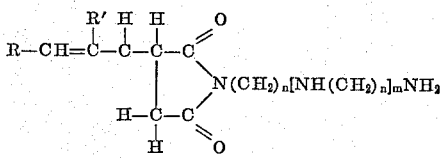

wherein R and R' are selected from the group consisting of hydrogen and unsubstituted hydrocarbon radicals, and the total number of carbon atoms in R and R' is 40 to 250, $n$ is 2 to 3, and $m$ is 0 to 4, with 1 to 2 molar proportions of formic acid to form a formamide by refluxing said monoalkenyl succinimide and formic acid together and removing water.

4. A method according to claim 3, wherein $n$ is 2 and $m$ is 3.

References Cited by the Examiner

UNITED STATES PATENTS

| 3,017,416 | 1/62 | Lo et al. | 260—326.5 |
| 3,018,250 | 1/62 | Anderson et al. | 252—51.5 |
| 3,018,291 | 1/62 | Anderson et al. | 260—326.5 |
| 3,024,195 | 3/62 | Drummond et al. | 252—51.5 |
| 3,029,250 | 4/62 | Gaertner | 260—326.5 |

IRVING MARCUS, Primary Examiner.

D. E. WYMAN, NICHOLAS S. RIZZO, WALTER A. MODANCE, Examiners.